(12) United States Patent
Sivan et al.

(10) Patent No.: US 11,216,705 B2
(45) Date of Patent: Jan. 4, 2022

(54) OBJECT DETECTION BASED ON MACHINE LEARNING COMBINED WITH PHYSICAL ATTRIBUTES AND MOVEMENT PATTERNS DETECTION

(71) Applicant: Anyvision Interactive Technologies Ltd., Holon (IL)

(72) Inventors: Ishay Sivan, Tel-Aviv (IL); Ailon Etshtein, Tel-Aviv (IL); Alexander Zilberman, Holon (IL); Neil Martin Robertson, Holywood (GB); Sankha Subhra Mukherjee, Belfast (GB); Rolf Hugh Baxter, Holywood (GB)

(73) Assignee: Anyvision Interactive Technologies Ltd., Holon (IL)

( * ) Notice: Subject to any disclaimer, the term of this patent is extended or adjusted under 35 U.S.C. 154(b) by 0 days.

(21) Appl. No.: 16/933,052

(22) Filed: Jul. 20, 2020

(65) Prior Publication Data

US 2021/0056365 A1 Feb. 25, 2021

Related U.S. Application Data

(60) Provisional application No. 62/889,586, filed on Aug. 21, 2019.

(51) Int. Cl.
*G06K 9/62* (2006.01)
*G06K 9/00* (2006.01)
*G06T 7/80* (2017.01)
*G06T 7/50* (2017.01)
(Continued)

(52) U.S. Cl.
CPC ....... *G06K 9/6292* (2013.01); *G06K 9/00335* (2013.01); *G06K 9/46* (2013.01);
(Continued)

(58) Field of Classification Search
CPC .............. G06K 9/6292; G06K 9/6277; G06K 9/00335; G06K 9/6217; G06K 9/46;
(Continued)

(56) References Cited

U.S. PATENT DOCUMENTS 10,810,445 B1 * 10/2020 Kangaspunta ....... G06K 9/6262
2008/0112593 A1 * 5/2008 Ratner .................. G06K 9/469
382/103
(Continued)

OTHER PUBLICATIONS

Classifiers combination techniques: A Comprehensive review., Mohamed Mohandes et al., IEEE Access, 2169-3536, 2018, pp. 19626-19639 (Year: 2018).*
(Continued)

*Primary Examiner* — Jayesh A Patel

(57) ABSTRACT

Presented herein are systems and methods for increasing reliability of object detection, comprising, receiving a plurality of images of one or more objects captured by imaging sensor(s), receiving an object classification coupled with a first probability score from machine learning model(s) trained to detect the object(s) and applied to the image(s), computing a second probability score for classification of the object(s) according to physical attribute(s) of the object(s) estimated by analyzing the image(s), computing a third probability score for classification of the object(s) according to a movement pattern of the object(s) estimated by analyzing at least some consecutive images, computing an aggregated probability score aggregating the first, second and third probability scores, and outputting, in case the aggregated probability score exceeds a certain threshold, the classification of each object coupled with the aggregated probability score for use by object detection based system(s).

17 Claims, 5 Drawing Sheets

(51) Int. Cl.
*G06T 7/20* (2017.01)
*G06K 9/46* (2006.01)

(52) U.S. Cl.
CPC ......... *G06K 9/6217* (2013.01); *G06K 9/6277* (2013.01); *G06T 7/20* (2013.01); *G06T 7/50* (2017.01); *G06T 7/80* (2017.01); *G06T 2207/10016* (2013.01); *G06T 2207/20076* (2013.01); *G06T 2207/20081* (2013.01); *G06T 2207/20084* (2013.01)

(58) Field of Classification Search
CPC .. G06K 9/00805; G06K 9/00825; G06T 7/80; G06T 7/50; G06T 7/20; G06T 2207/20084; G06T 2207/20076; G06T 2207/10016; G06T 2207/20081; G06T 2207/10021; G06T 2207/10048; G06T 7/277; G06T 7/521; G06T 7/593; G06T 7/60; G06T 7/77
See application file for complete search history.

(56) References Cited

U.S. PATENT DOCUMENTS

| | | | | |
|---|---|---|---|---|
| 2016/0343146 | A1* | 11/2016 | Brown | G06T 7/246 |
| 2017/0124415 | A1* | 5/2017 | Choi | G06K 9/628 |
| 2018/0089505 | A1* | 3/2018 | El-Khamy | G06N 7/005 |
| 2019/0180119 | A1* | 6/2019 | Chen | G06K 9/6274 |
| 2019/0392268 | A1* | 12/2019 | Tariq | G06K 9/00791 |
| 2020/0285910 | A1* | 9/2020 | Steelberg | G06K 9/6292 |
| 2021/0073558 | A1* | 3/2021 | Li | G06T 7/248 |
| 2021/0089841 | A1* | 3/2021 | Mithun | G06K 9/4604 |

OTHER PUBLICATIONS

Robust Lane Detection and Tracking in Challenging Scenarios, Zu Whan Kim., IEEE, 1524-9050, 2008, pp. 16-26 (Year: 2008).*

* cited by examiner

OBJECT DETECTION BASED ON MACHINE LEARNING COMBINED WITH PHYSICAL ATTRIBUTES AND MOVEMENT PATTERNS DETECTION

RELATED APPLICATION(S)

This application claims the benefit of priority under 35 USC § 119(e) of U.S. Provisional Patent Application No. 62/889,586 filed on Aug. 21, 2019, the contents of which are all incorporated by reference as if fully set forth herein in their entirety.

FIELD AND BACKGROUND OF THE INVENTION

The present invention, in some embodiments thereof, relates to increasing reliability of object detection, and, more specifically, but not exclusively, to increasing reliability of object detection based on machine learning combined with physical attributes and movement patterns detection.

Object detection has become a corner stone for a plurality of applications ranging from military and public order applications to commercial applications and services, for example, autonomous vehicles, public order systems, security systems, surveillance systems and/or the like.

The immense and rapid advancement in Artificial Intelligence (AI) and Machine Learning (ML) has paved the way for highly efficient object detection using such ML models, in particular with recent major research and development of neural networks which present unprecedented capacities in the detecting and classifying objects by based on image analysis.

SUMMARY OF THE INVENTION

According to a first aspect of the present invention there is provided a computer implemented method of increasing reliability of object detection, comprising:

Receiving a plurality of images of one or more objects captured by one or more imaging sensors.

Receiving an object classification coupled with a first probability score from one or more machine learning models trained to detect the one or more objects and applied to one or more of the plurality of images.

Computing a second probability score for classification of the one or more objects according to one or more physical attributes of the one or more objects estimated by analyzing the one or more images;

Computing a third probability score for classification of the one or more objects according to a movement pattern of the one or more objects estimated by analyzing at least some consecutive images of the plurality of images.

Computing an aggregated probability score by aggregating the first, second and third probability scores.

Outputting, in case the aggregated probability score exceeds a certain threshold, the classification of the one or more objects coupled with the aggregated probability score for use by one or more object detection based systems.

According to a second aspect of the present invention there is provided a system for increasing reliability of object detection, comprising one or more processors executing a code, the code comprising:

Code instructions to receive a plurality of images of one or more objects captured by one or more imaging sensors.

Code instructions to receive an object classification coupled with a first probability score from one or more machine learning models trained to detect the one or more objects and applied to one or more of the plurality of images.

Code instructions to compute a second probability score for classification of the one or more objects according to one or more physical attributes of the one or more objects estimated by analyzing the one or more images.

Code instructions to compute a third probability score for classification of the one or more objects according to a movement pattern of the one or more objects estimated by analyzing at least some consecutive images of the plurality of images.

Code instructions to compute an aggregated probability score by aggregating the first, second and third probability scores.

Code instructions to output, in case the aggregated probability score exceeds a certain threshold, the classification of the one or more objects coupled with the aggregated probability score for use by one or more object detection based systems.

In a further implementation form of the first and/or second aspects, one or more of the machine learning models are neural network.

In a further implementation form of the first and/or second aspects, each of the one or more physical attributes is a member of a group consisting of: a shape, a size, a height and, a width and/or a length.

In a further implementation form of the first and/or second aspects, the movement pattern is defined by one or more movement attributes each a member of a group consisting of: a speed, an acceleration and/or a direction.

In a further implementation form of the first and/or second aspects, one or more algorithms are applied to ensure that each of the one or more objects is the same object classified by the one or more machine learning models, classified based on the estimated one or more physical attribute and classified based on the estimated movement pattern.

In a further implementation form of the first and/or second aspects, one or more of the algorithms comprise an intersection over union.

In an optional implementation form of the first and/or second aspects, a bounding box is received from one or more of the machine learning models. The bounding box bounds one or more of the objects in the one or more images and computing the second and third probability scores for classification of the respective object which is detected in the bounding box.

In an optional implementation form of the first and/or second aspects, one or more of the physical attributes of one or more of the objects are identified based on the bounding box received from one or more of the machine learning models.

In a further implementation form of the first and/or second aspects, the analysis of the one or more images to estimate the one or more physical attributes and the movement pattern is based on a proportion between a pixel size characteristic to the one or more imaging sensors and a distance between the one or more imaging devices and the respective object, the proportion is determined based on calibration of the one or more imaging sensors.

In a further implementation form of the first and/or second aspects, the calibration is based on one or more predefined physical attributes of one or more reference objects detected in one or more images captured by the one or more imaging sensors.

In a further implementation form of the first and/or second aspects, the calibration is based on a distance to one or more reference objects detected in one or more images captured by the one or more imaging sensors. The distance is determined according to a predefined distance and/or a measurement received from one or more distance measurement devices associated with the one or more imaging sensors.

In a further implementation form of the first and/or second aspects, the calibration is based on depth data received from one or more imaging sensors.

In an optional implementation form of the first and/or second aspects, a plurality of the consecutive images are analyzed to identify the one or more physical attributes of the one or more objects.

In an optional implementation form of the first and/or second aspects, the third probability score is adjusted according to an impact to the movement pattern induced by a terrain on which the respective object is moving.

In an optional implementation form of the first and/or second aspects, a plurality of the consecutive sequences of images are analyzed to average the aggregated probability score over time.

In an optional implementation form of the first and/or second aspects, the aggregated probability score is computed based on weights assigned to the first, second and/or third probability scores according to a size of the one or more objects and/or a distance of the one or more objects.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
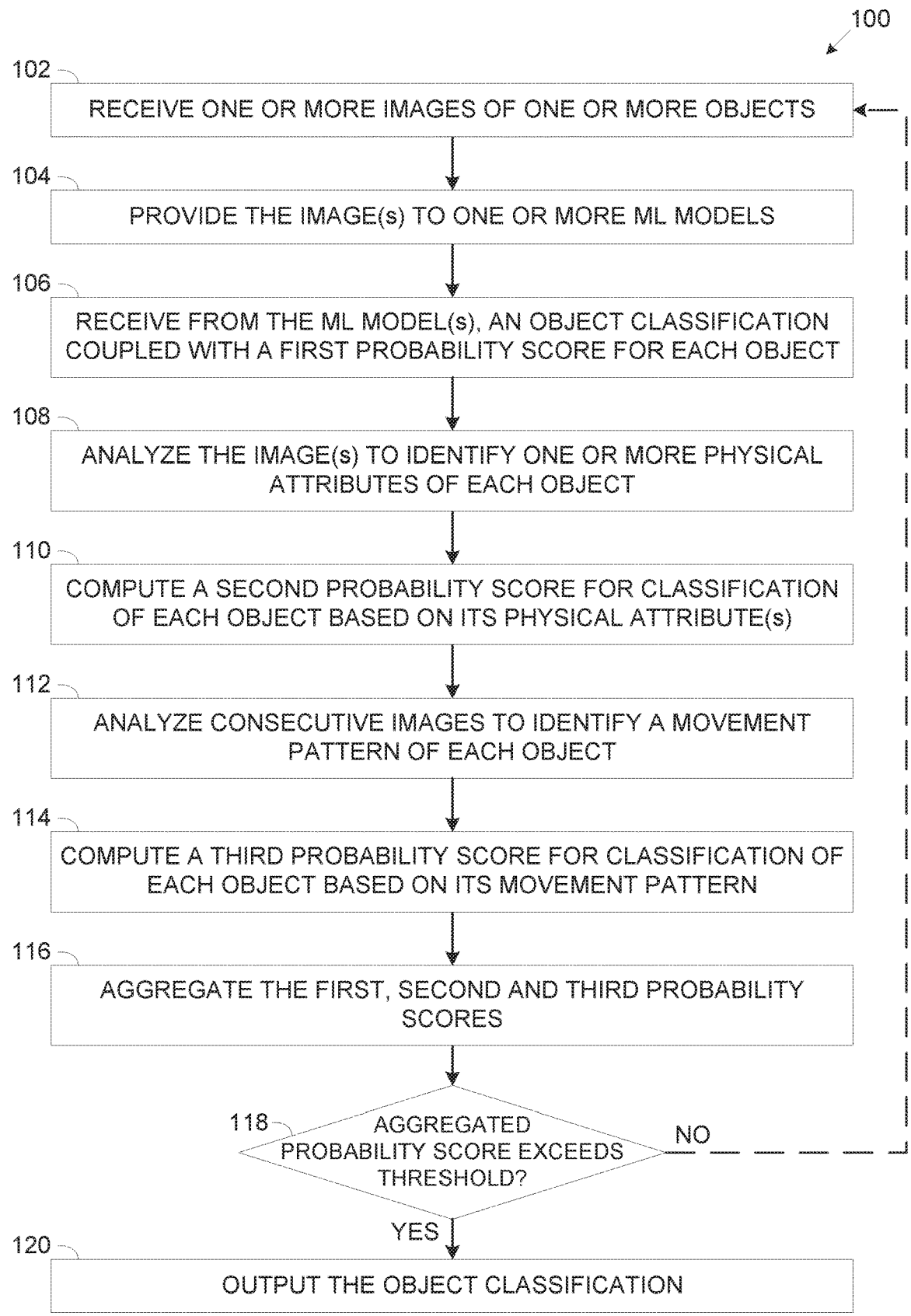
FIG. 1 is a flowchart of an exemplary process of increasing reliability of object detection based on machine learning combined with physical attributes and movement patterns detection, according to some embodiments of the present invention.

The present invention, in some embodiments thereof, relates to increasing reliability of object detection, and, more specifically, but not exclusively, to increasing reliability of object detection based on machine learning combined with physical attributes and movement patterns detection.

According to some embodiments of the present invention, there are provided methods, systems and computer program products for enhancing object detection by increasing the reliability of object detection using Machine Learning (ML) models by further identifying and/or estimating physical attributes and movement patterns of the detected objects, for example, a person, an animal, a tree, a car, a structure, a traffic infrastructure object (e.g. traffic light, sign, sign pole, etc.) and/or the like.

The object detection is based primarily on image processing of images captured by one or more imaging sensors, for example, a camera, a video camera, a night vision camera, an Infrared camera, a thermal camera, a stereoscopic camera and/or the like to depict one or more objects present in the field of view of the imaging sensor(s).

One or more ML models, for example, a neural network such as, for example, a Convolutional Neural Network (CNN), a support Vector Machine (SVM) and/or the like which are trained to detect and classify the objects may be applied to the captured images to classify the object(s) detected in the images.

The ML model(s) applied to the images depicting the object(s) may output a class (label) of each detected object typically associated with a probability score reflecting a probability that the respective object is correct classified to its correct class. In other words, the probability score designated first probability score herein after indicates the confidence level in the correct classification of the respective object. The ML model(s) may further output a bounding box for one or more of the detected and classified objects which bound the respective object in the image (frame).

The enhanced object detection is based on further aggregating, complementing and/or correlating the classification determined by the ML model(s) with classification of the detected objects according to physical attributes and/or movement patterns identified for the detected objects compared to physical attributes and/or movement patterns typical to these detected objects based on their classification.

One or more of the captured images may be therefore analyzed using one or more methods as known in the art, for example, image processing, computer vision and/or the like to identify, estimate and/or compute one or more of the physical attributes of each detected object, for example, a shape, a size, a height, a width, a length and/or the like.

A plurality of captured images, in particular consecutive images may be further analyzed, using the image processing method(s) to identify, estimate and/or compute a movement pattern for each of the detected objects. The movement pattern (movement vector) of each detected object may be defined by one or more movement attributes, for example, a direction, a speed, an acceleration and/or the like.

The physical attributes as well as the movement attributes of each detected object may be identified, estimated and/or computed based on a proportion (scale) of the pixel size with respect to real world dimensions' measurements together with the estimated distance of the respective detected object. The proportion, i.e. the translation of the pixel size to real world size may be established by calibrating the imaging sensor using one or more calibration methods as described in detail herein after.

Based on the identified physical attributes, a second probability score may be computed based on comparison of the physical attributes identified for each detected object with the physical attributes typical to the respective detected object which is determined according to its class (label). For example, assuming the identified height of a certain object classified as a person is 1.7 meters. Since the typical height of humans is in the range of 1.4-2.0 meters, the second probability score computed for the certain person object may be significantly high. However, assuming the identified height of a certain object classified as a person is 3.0 meters, the second probability score computed for the certain person object may be significantly low.

The second probability score computed for one or more of the detected objects may be further adjusted based on aggregation of a plurality of physical attributes identified for the respective object, for example, the height and the width compared to the physical attributes typical to the detected object.

Based on the identified movement pattern, a third probability score may be computed based on comparison of the movement attributes identified for each detected object with the movement attributes typical to the respective detected object. For example, assuming the identified speed a certain object classified as a person is 6 KM/h. Since the typical speed of humans is in the range of 2-10 KM/h, the third probability score computed for the certain person object may be significantly high. However, assuming the identified speed of a certain object classified as a person is 40 KM/h, the third probability score computed for the certain person object may be significantly low.

Similarly, the third probability score computed for one or more of the detected objects may be further adjusted based on aggregation of a plurality of movement attributes identified for the respective object, for example, the direction and the speed compared to the movement attributes typical to the detected object which are determined according to its class.

The first, second and third probability score computed for each detected object may be then aggregated according to one or more aggregation schemes, methods and/or algorithms which may further reflect potential dependencies between the computed scores to produce an aggregated probability score.

The aggregated probability score may be then compared to a certain threshold defined to indicate the required confidence level in the classification of each detected object. In case the aggregated probability score exceeds the threshold, the classification of each detected object optionally with one or more of the physical attributes and/or movement attributes of the respective detected object may be outputted, transmitted, delivered and/or otherwise provided to one or more object detection based systems, for example, a security system, a surveillance system and/or the like which may use the object detection and classification according to the nature of the application.

Enhancing the object detection based on the physical and movement attributes of the detected objects may present major advantages compared to existing methods and system for object detection, specifically such methods and systems which are based on ML models classification.

First, the ML model(s) applied by the existing methods to detect objects and compute their respective classification probability scores may typically analyze a single image or a limited number of images at best which may have limited accuracy, reliability and/or robustness. In contrast, the enhanced object detection may apply temporal fusion in which a plurality of images, for example, consecutive images may be analyzed to detect objects and increase reliability of the classification of these detected object(s). Moreover, the classification (first) probability score achieved by the temporal fusion may be further improved according to the second and/or third probability scores computed based on the compliance of the detected physical attributes and/or movement patterns of the detected objects with the physical attributes and/or movement patterns typical to these detected objects. The aggregation of the first, second and third probability scores may therefor significantly increase the classification accuracy, reliability and/or robustness of the enhanced object detection compared to the existing methods.

Moreover, the classification accuracy, reliability and/or robustness of the ML model(s) may be limited in particular for small objects and/or distant objects which occupy relatively small regions of pixels in the captured images, for example, 16×16 pixels, 12×12 pixels, 8×8 pixels and/or 5×5 pixels. Existing methods and systems using such ML model(s) may be therefore limited in their ability to accurately classify such small and/or distant objects. The enhanced object detection on the other hand which is not solely reliant on the classification of the objects by the ML model(s) but rather on the aggregation of the ML model(s) classification (first probability score) and the compliance of the detected physical attributes (second probability score) and/or movement patterns (second probability score) may significantly increase the classification accuracy, reliability and/or robustness for such small and/or distant objects compared to the existing methods.

Furthermore, by enforcing the classification of the ML model(s) with the physical and movement based classification, the ML model(s) utilized for the enhanced object detection may be significantly less complex, for example, neural networks which are simpler (less deep) compared to the ML models used by the existing face recognition methods while maintaining high accuracy, reliability and robustness of the object detection and classification. This may significantly reduce the computing resources required for executing the reduced complexity ML model(s), for example, processing resources, storage resources, processing time and/or the like thus reducing time, costs and/or effort for deploying the ML model(s). Moreover, the reduced complexity ML model(s) may be trained using significantly reduced computing resources thus further reducing time, costs and/or effort for deploying the ML model(s).

In addition, aggregating the classification of the ML model(s) with the physical and movement based classification may compensate for somewhat reduced accuracy and/or confidence level of the ML model(s) classification. The imaging sensors utilized for the enhanced object detection may be therefore lower end and cost effective sensors having significantly lower quality and/or resolution compared to high end imaging sensors required for producing high quality/resolution images to allow high accuracy of the ML model(s) classification as may be done by the existing object detection methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of increasing reliability of object detection based on machine learning combined with physical attributes and movement patterns detection, according to some embodiments of the present invention. An exemplary process 100 may be executed by an object detection system to classify objects detected in images and further increase reliability of the object classification by combining classification results received from one or more ML models with classification estimated based on physical attributes and movement patterns of the detected objects.

Figure 2:
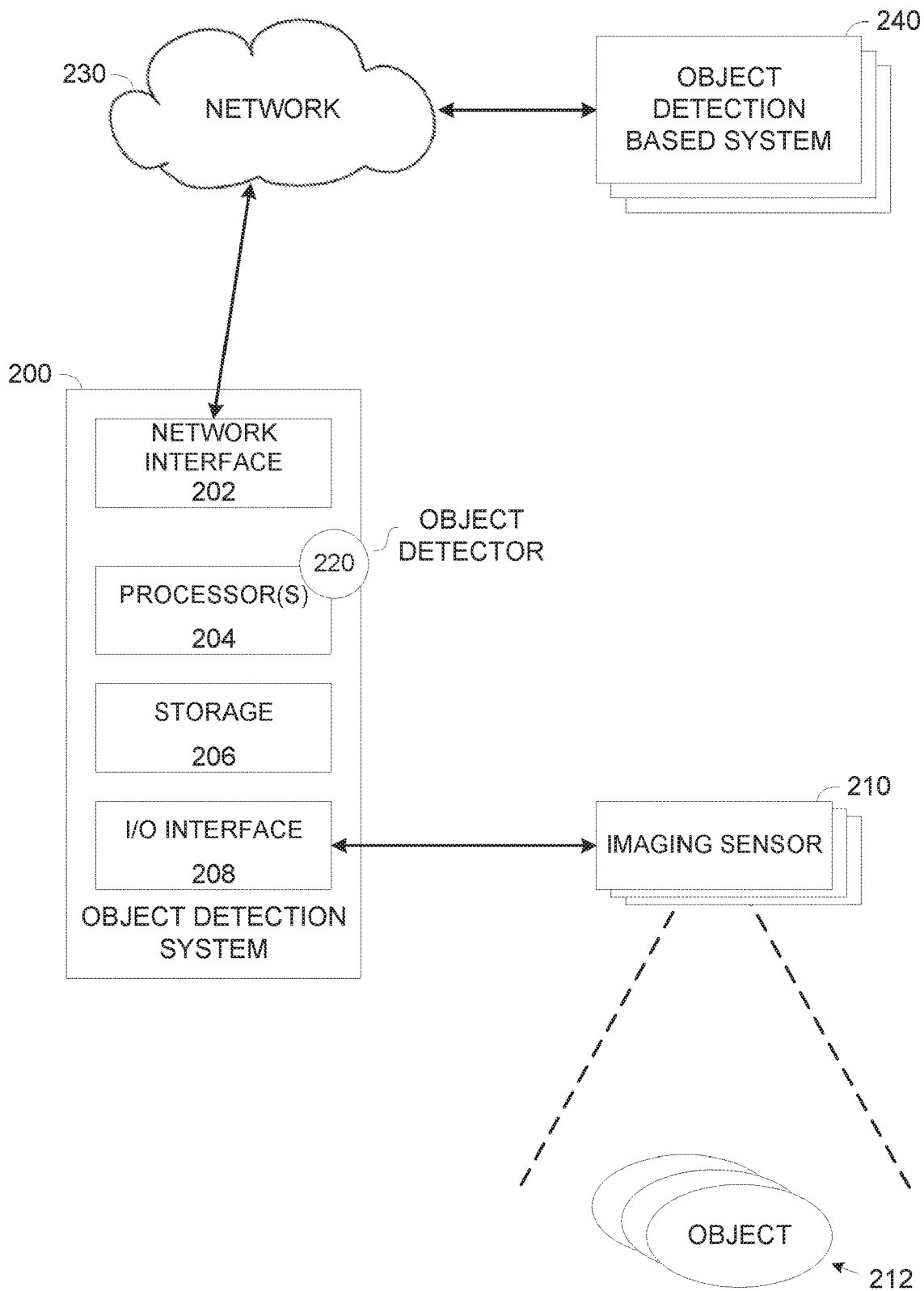
FIG. 2 is a schematic illustration of an exemplary system for increasing reliability of object detection based on machine learning combined with physical attributes and movement patterns detection, according to some embodiments of the present invention.

Reference is also made to FIG. 2, which is a schematic illustration of an exemplary system for increasing reliability of object detection based on machine learning combined with physical attributes and movement patterns detection, according to some embodiments of the present invention. An exemplary object detection system 200 may execute a process such as the process 100 for increasing reliability of classification of one or more objects 212 detected in images captured by one or more imaging sensors 210, for example, a person, an animal, a tree, a car, a structure, a traffic infrastructure object (e.g. traffic light, sign, sign pole, etc.) and/or the like. Specifically, the classification reliability may be increased by combining the classification received from the ML model(s) with classification probabilities computed based on physical attributes and movement patterns of the detected objects 212.

The object detection system 200 may include a network interface 202 for connecting to a network 230, a processor(s) 204 for executing the process 100 and/or part thereof, and a storage 206 for storing data and/or program (program store).

The network interface 202 may include one or more wired and/or wireless network interfaces for connecting to the network 230 comprising one or more wired and/or wireless networks, for example, a Local Area Network (LAN), a Wireless LAN (WLAN), a Wide Area Network (WAN), a Wide Area Network (WAN), a Municipal Area Network (MAN), a cellular network, the internet and/or the like. Via the network interface 202, the object detection system 200 may communicate with one or more remote network resources connected to the network 230.

The processor(s) 204, homogenous or heterogeneous, may include one or more processors arranged for parallel processing, as clusters and/or as one or more multi core processor(s). The storage 206 may include one or more non-transitory persistent storage devices, for example, a Read Only Memory (ROM), a Flash array, a hard drive and/or the like. The storage 206 may also include one or more volatile devices, for example, a Random Access Memory (RAM) component, a cache memory and/or the like. The storage 206 may further include one or more network storage resources, for example, a storage server, a network accessible storage (NAS), a network drive, a cloud storage and/or the like accessible via the network interface 202.

The object detection system 200 may further include and Input/Output (I/O) interface 208 for connecting to one or more of the imaging sensors 210, for example, a camera, a video camera, a night vision camera, an Infrared camera, a thermal camera, a stereoscopic camera and/or the like. The I/O interface 208 may include one or more wired and/or wireless interfaces, for example, a Universal Serial Bus (USB) interface, a serial interface, a Radio Frequency (RF) interface, a Bluetooth interface and/or the like for communicating with one or more of the imaging sensors 210. The I/O interface 208 may also include one or more network interfaces such as the network interface 202 for connecting to one or more of the imaging sensors 210. The object detection system 200 may therefore communicate with the imaging sensor(s) 210 via the I/O interface 208.

Optionally, one or more of the imaging sensors 210 are integrated with the object detection system 200.

The processor(s) 204 may execute one or more software modules such as, for example, a process, a script, an application, an agent, a utility, a tool and/or the like each comprising a plurality of program instructions stored in a non-transitory medium (program store) such as the storage 206 and executed by one or more processors such as the processor(s) 204. For example, the processor(s) 204 may execute an object detector 220 for executing the process 100 and/or part thereof. The object detector 220 may optionally utilize and/or facilitate one or more hardware elements integrated, coupled with and/or utilized by the object detection system 200, for example, a circuit, a component, an Integrated Circuit (IC), an Application Specific Integrated Circuit (ASIC), a Field Programmable Gate Array (FPGA), a Digital Signals Processor (DSP) and/or the like.

Optionally, the process 100 and/or part thereof is executed by one or more remote systems, for example, a computer, a server, a computing node, a cluster of computing nodes and/or the like connected to the network 230 and communicating with the object detection system 200.

Optionally, the object detection system 200, the object detector 220 and/or part thereof are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The object detector 220 may provide the classification of the detected objects 212 to one or more object detection based systems 240, for example, an autonomous vehicle (e.g. autonomous car, drone, etc.), a public order system, a security system, a surveillance system and/or the like. The object detection based system(s) 240 may be connected to the network 230 such that the object detector 220 may communicate with the object detection based system(s) 240 via the network 230 to provide, i.e., transmit the classification (label, identifier, etc.) of the detected objects 212 to the object detection based system(s) 240.

Optionally, one or more of the face recognition based systems 240 integrates the object detection system 200 and thus executes the object detector 220.

As shown at 102, the process 100 starts with the object detector 220 receiving a plurality of images captured by one or more of the imaging sensors 210 which may depict one or more objects 212 present in the field of view of the imaging sensor(s) 210, for example, a person, an animal, a tree, a car, a structure, a traffic infrastructure object (e.g. traffic light, sign, sign pole, etc.) and/or the like.

As shown at 104, the object detector 220 may provide, transmit and/or output one or more of the images of the object(s) 212 to one or more classifiers as known in the art, in particular one or more Machine Learning (ML) models such as, for example, a neural network, an SVM and/or the like trained to detect and classify objects such as the objects 212. The ML model(s) may be utilized by one or more trained neural networks, in particular a Convolutional Neural Network (CNN) such as known in the art, for example, LeNet, AlexNet, VGGNet, GoogLeNet, OverFeat, R-CNN, Fast R-CNN, Faster R-CNN and/or the like.

As known in the art, some ML model(s) may be trained to extract feature vectors from the images and classify the extracted feature vectors to respective object classes (labels), for example, a person, an animal, a tree, a car, a structure, a traffic infrastructure object (e.g. traffic light, sign, sign pole, etc.) and/or the like. The object classes may be estimated for the detected objects 212 based on mapping the extracted feature vectors of the objects 212 processed and learned by the ML model(s) during their training phase.

The ML model(s) may compute a probability score (confidence score) associated with the class (label) of each object 212. The probability score indicates a probability (confidence) of correctly classifying the respective object 212 to a respective class (label). The probability score expressing the confidence of correct classification of the respective object 212 may be interpreted as the distance between the feature vector(s) extracted from the image(s) of the respective object 212 captured by the imaging sensor(s) 216 and feature vectors extracted from training images of the respective object 212 used to train the ML model(s).

The probability score computed by the ML model(s) for each detected object 212 is designated first probability score $P_1$ herein after where $P_1$ is in a range of $0 \leq P_1 \leq 1$.

The ML model(s) may further output a bounding box associated with each detected and classified object 212. Each bounding box may bound the respective object 212 in the image such that the bounding box encompasses a region of pixels in the image occupied by the respective object 212.

As shown at 106, the object detector 220 may receive from the ML model(s) the classification, i.e., the class (label) of each detected object 212 associated with the first probability score $P_1$ computed by the ML model(s) to express the confidence of correctly classifying the respective object 212 and the bounding box bounding the respective object 212 in the image(s).

As shown at 108, the object detector 220 may apply one or more image processing methods and/or algorithms as known in the art to analyze one or more of the captured images depicting each detected object 212 to identify one or more physical attributes of the respective object 212, for example, a shape, a size, a height, a width, a length and/or the like.

The object detector 220 may apply one or more methods to correlate in the captured image(s) between each object 212 classified by the ML model(s) and each object 212 whose physical attribute(s) the object detector 220 identifies in order to ensure that the same object 212 is processed by both the object detector 220 and the ML model(s). For example, the object detector 220 may apply one or more intersection over union algorithms to correlate and identify in the captured image(s) each object 212 classified by the ML model(s). Such intersection over union algorithms may include, for example, optical flow, Kalman filter, intersection over union with last CNN output and/or the like. For example, objects may be tracked across multiple consecutive images (frames) by defining a bounding box (detection rectangle) containing a detected object 212. Even though he the multiple consecutive images may be extracted from the same stream of images, the bounding box(s) defined for one or more objects 212 in the images may slightly differ between images. Therefore, using the optical flow algorithm and/or the Kalman filter for prediction of the next bounding box, i.e. predicting the bounding box (location) in one or more of the next (subsequent) images may significantly enhance the correlation across multiple images.

Moreover, the object detector 220 may use the bounding box defined in the image(s) by the ML model(s) for each object 212 to correlate between the object 212 classified by the ML model(s) and the object 212 processed by the object detector 220 thus ensuring that the same object 212 is processed by both the object detector 220 and the ML model(s).

The object detector 220 may accurately identify, i.e., compute or estimate the physical attributes of each detected object 212 based on analysis of the captured images(s) according to a proportion (scale) between pixel size characteristic to the imaging sensor(s) 210 which captured the image of the object 212 and a real world distance, in particular the distance between the imaging device 210 and the object 212 itself. Therefore, after estimating the distance to each object 212 and based on the established proportion, the object detector 220 may apply one or more methods, computations and/or algorithms based on the geometry of each object 212 detected in the image to compute the physical attributes of the respective object 212.

The object detector 220 may determine the proportion between the pixel size and real world dimension measurement units, specifically distance or length units (e.g. centimeters, meters, kilometers, etc.) based on calibration of the imaging sensor(s) 210 with respect to the real world. To this end the object detector 220 may apply one or more calibration methods and/or techniques.

The calibration may be done once and/or periodically for stationary imaging sensor(s) 210 having a fixed and static location which is not changed. However, in case the imaging sensor 210 is mobile and changing locations, calibration must be carried out after the imaging sensor 210 is positioned in a certain location and before initiating the process 100 for classifying objects 212 detected in images captured by the imaging sensor 210.

Figure 3:
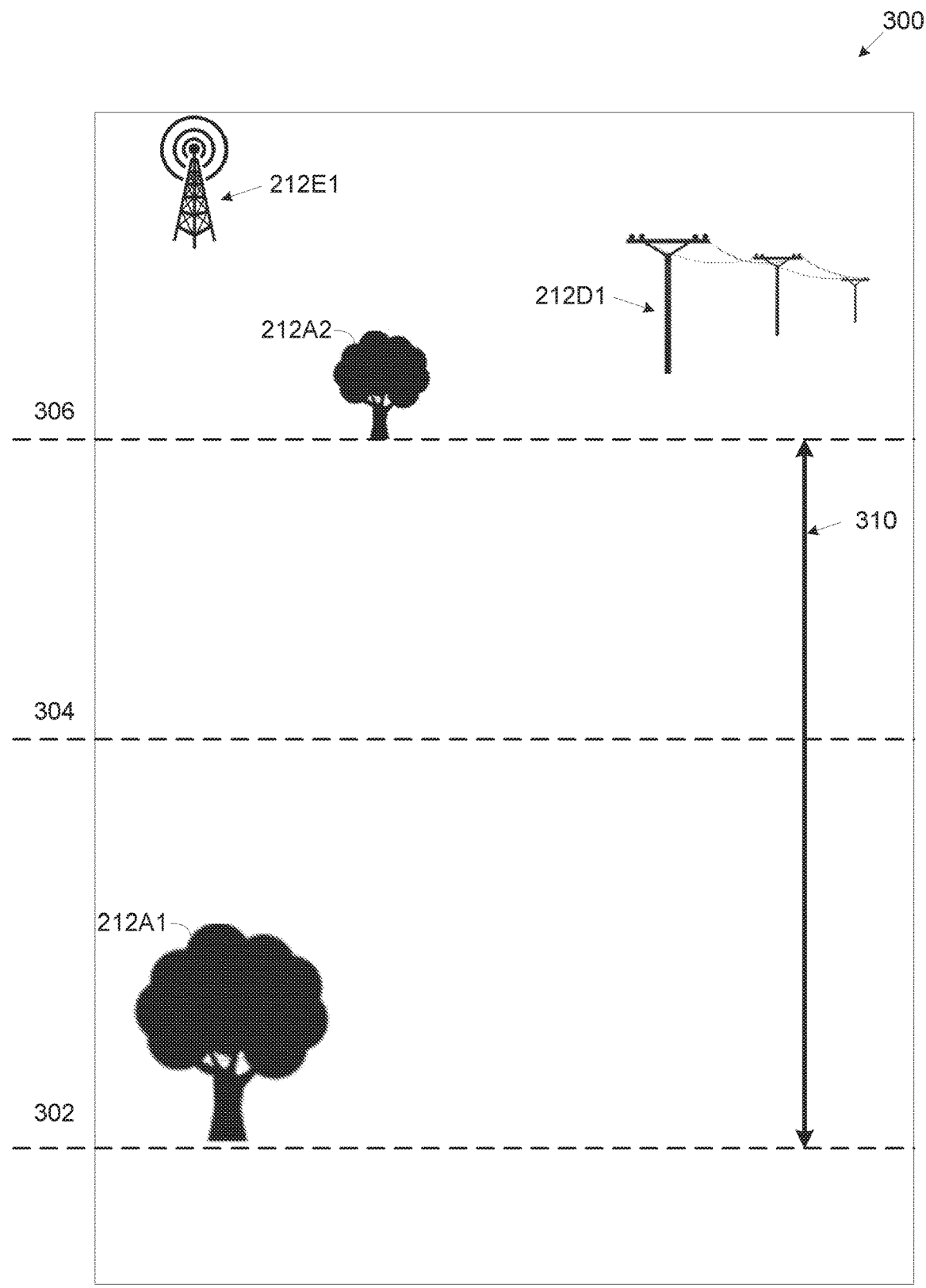
FIG. 3 is a schematic illustration of an exemplary image analyzed for calibrating imaging sensors, according to some embodiments of the present invention.

Reference is now made to FIG. 3, which is a schematic illustration of an exemplary image analyzed for calibrating imaging sensors, according to some embodiments of the present invention. A plurality of objects such as the object 212, for example, a tree 212A1, a tree 212A2, a power line pole 212D1 and an antenna tower (e.g. based station) 212E1 may be detected in an exemplary image 300 captured by an imaging sensor such as the imaging sensor 210.

In one exemplary calibration method, an object detector such as the object detector 220 may determine the proportion (scale) between the pixel size and real world measurement units according to one or more predefined and known physical attributes of one or more objects 212 detected in one or more images captured by the imaging sensor(s) 210. For example, assuming that the power line pole 212D1 detected in the image 300 has a predefined height, for example, 20 meters and further assuming that the power line pole is fully visible in the image 300 from one end to the other, i.e. from the ground up. The object detector 220 may therefore analyze the image 300 and compute the number of pixels that the power line pole 212D1 stretches across in the image 330. Based on the predefined height of the power line pole 212D1, the object detector 220 may compute the proportion between the height of the power line pole 212D1 expressed in pixel number and in real world units (20 meters) and may thus determine the proportion and the real world units expressed by the pixel size. Using the proportion, the object detector 220 may further compute the distance between the imaging sensor 210 and the power line pole 212D1 according to pixel size proportion multiplied by the number of pixels forming this distance in the image 300.

In another exemplary calibration method, the object detector 220 may determine the proportion (scale) between the pixel size and real world measurement units according to a predefined and known distance to one or more reference objects 212 detected in one or more images captured by the imaging sensor(s) 210. For example, assuming that the location of the imaging sensor 210 is known, for example, according to one or more geolocation sensors and/or devices such as, for example, a global Positioning system (GPS) device. Further assuming the actual (real world) distance to a certain object 212 detected in the image 300, for example, the antenna tower (e.g. based station) 212E1 is known, for example, 3 kilometers. Based on the known distance between the imaging sensor 210 and the power line pole 212D1, the object detector 220 may compute the proportion between the distance to the power line pole 212D1 expressed in pixel number and in real world units (3 kilometers) and may thus determine the proportion and the real world units expressed by the pixel size.

The object detector 220 may obtain (learn) the real world distance to one or more objects detected in the image(s) captured by the imaging sensor(s) 210 using one or more methods. For example, the object detector 220 may receive the distance from one or more distance measurement devices, for example, a laser measuring device associated with the imaging sensor(s) 210 such that its relative location with respect to the imaging sensor(s) 210 is known and may be substantially accurately correlated with the field of view of the imaging sensor(s) 210. In another example, the object detector 220 may retrieve, for example, from one or more mapping resources, for example, a map, a navigation system and/or the like.

In another exemplary calibration method, the object detector 220 may determine the proportion (scale) between the pixel size and real world measurement units according to depth data received from the imaging sensor(s) 210 assuming such depth data is available, for example, in case the imaging sensor(s) 210 are stereoscopic sensor employing stereoscopic vision from which depth data may be retrieved.

After establishing the proportion between pixel size and real world measurement units, the object detector 220 may further map the real world distance to one or more objects 212 detected in the image(s). For example, based on the exemplary image 300, the object detector 220 may map the distances to one or more of the tree 212A, the tree 212A2, the power line pole 212D1 and/or the antenna tower 212E1. For example, the object detector 220 may create one or more mapping distance lines across the image(s) according to the established pixel size and proportion which express the distance from the imaging sensor(s) 210, for example, a distance line 302 expressing a first distance (e.g. 100 meters), a distance line 304 expressing a second distance (e.g. 300 meters) and a distance line 306 expressing a third distance (e.g. 500 meters). As such the distance 310 between the distance line 302 and the distance line 306 is estimated by the object detector 220 as 400 meters.

Once the pixel proportion is established and the image(s) and the field of view of the imaging sensor(s) 210 is mapped with distances to the reference objects 212, the object detector 220 may identify one or more of the physical attributes of one or more of the objects 212 detected in the captured image(s).

The object detector 220 may first estimate the distance to each detected object 212 and may then apply the proportion applicable for the estimated distance. Naturally, the further the object 212 is from the imaging sensor(s) 210, the larger is the world dimension measurement represented by the pixel size and vice versa, the closer the object 212 is to the imaging sensor(s) 210, the smaller is the real world dimension measurement represented by the pixel size.

The object detector 220 may identify, i.e., compute and/or estimate the physical attribute(s) of each detected object 212 by measuring the physical attribute, for example, the shape, the size, the height, the width, the length and/or the like of the contour and/or outline of the respective object 212 in pixels and applying the proportion to translate the measured physical attribute(s) to real world dimension units.

Optionally, the object detector 220 may identify the physical attribute(s) of one or more of the detected objects 212 based on the bounding box received from the ML model(s) for the respective object 212. Similarly, the object detector 220 may measure one or more physical attributes, for example, the shape, the height, the width of the bounding box and apply the proportion to translate the measured physical attribute(s) to real world dimension units.

Figure 4:
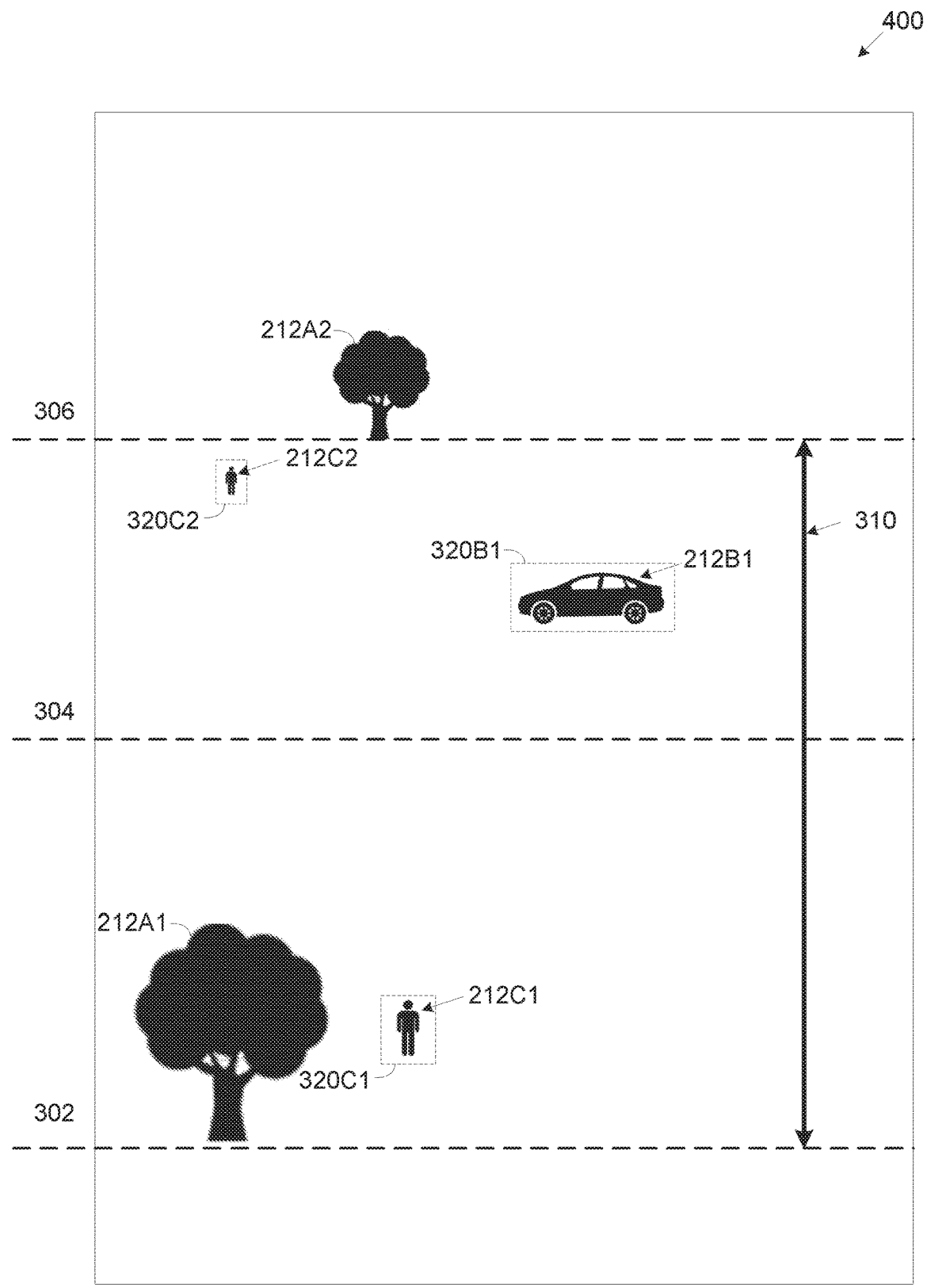
FIG. 4 is a schematic illustration of an exemplary image analyzed to identify and estimate physical attributes of detected objects, according to some embodiments of the present invention.

Reference is now made to FIG. 4, which is a schematic illustration of an exemplary image analyzed to identify and estimate physical attributes of detected objects, according to some embodiments of the present invention. An object detector such as the object detector 220 may detect one or more objects 212, for example, a first person 212C1, a second person 212C2 and a vehicle 212B1 in an exemplary image 400 captured by an imaging sensor such as the imaging sensor 210.

The object detector 220 may apply one or more linear extrapolation computations to estimate the distance of each of the detected objects 212 based on the distance mapping established during the calibration. For example, based on the 100 meters mapping line 302 and the 300 meters mapping line 304, the object detector 220 may estimate that the person 212C1 is located at a distance of 150 meters from the imaging sensor 210. The object detector 220 may then apply the pixel size proportion to compute and/or estimate the actual (real world) dimensions of one or more of the physical attributes, for example, the height and/or the width of the person 212C1 based on its estimated distance. In another example, based on the 300 meters mapping line 304 and the 500 meters mapping line 306, the object detector 220 may estimate that the person 212C2 is located at a distance of 480 meters from the imaging sensor 210. The object detector 220 may then apply the pixel size proportion at that location in the image to compute and/or estimate the actual dimensions of one or more of the physical attributes, for example, the height and/or the width of the person 212C2 based on its estimated distance. In another example, based on the 300 meters mapping line 304 and the 500 meters mapping line 306, the object detector 220 may estimate that the car 212B1 is located at a distance of 400 meters from the imaging sensor 210. The object detector 220 may then apply the pixel size proportion to compute and/or estimate the actual dimensions of one or more of the physical attributes, for example, the length and/or the width of the car 212B1 based on its estimated distance.

As described herein before, the object detector 220 may receive from the ML model(s) a bounding box 320 for each potentially detected object 212, for example, a bounding box 320C1 for the first person 212C1, a bounding box 320C2 for the second person 212C2 and a bounding box 320B1 for the car 212B1. The object detector 220 may use the bounding boxes 320 to identify the object 212 in the image 400 to ensure that the same objects are targeted by both the object detector 220 and the ML model(s). The object detector 220 may further use one or more of the bounding boxes 320C1, 320C2 and/or 320B1 to identify and compute the physical attributes of the respective objects 212, specifically, the first person 212C1, the second person 212C2 and/or the vehicle 212B1 respectively.

Reference is made once again to FIG. 1.

As shown at 110, the object detector 220 may compute a probability score (designated second probability score $P_2$ herein after) for each of the objects 212 detected in the captured image(s) to express the confidence in the class estimated for the respective object 212. The object detector 220 may compute the second probability score $P_2$ for each detected object 212 based on predefined values of the physical attributes identified for each of the detected objects 212.

The class of each of the detected objects 212 may be estimated by the object detector 220 and/or the class may be based on the classification of the ML model(s), i.e., the class (label) received from the ML model(s).

For example, typical height of a person is in the range of 1.5-2.0 meters and typical width of a person is in the range of 0.4-0.8 meters. Therefore, in case the object detector 220 estimates the height of an object 212 classified as a person to be outside the typical height range (e.g. 2.8 meters) and/or the typical width range (e.g. 0.1 meters), the object detector 220 may compute a significantly low second probability score $P_2$ for the respective person object 212. However, in case the height of the object 212 classified as a person is within the typical height range (e.g. 1.8 meters) and/or the typical width range (e.g. 0.6 meters), the object detector 220 may compute a significantly high second probability score $P_2$ for the respective person object 212.

The object detector 220 may further compute the second probability score $P_2$ for one or more of the objects 212 based on aggregation of a plurality of physical attributes identified for the respective object 212. For example, assuming the height and width physical attributes identified and estimated by the object detector 220 for a certain object 212 classified as a person are 1.8 meters and 0.6 meters respectively. The second probability score $P_2$ computed by the object detector 220 based on the identified physical attributes may be therefore significantly high, for example, $P_2$ (height=1.8, widht=0.6)=0.8 where the second probability score $P_2$ is in a range of $0 \leq P_2 \leq 1$. In another example, assuming the height and width physical attributes identified and estimated by the object detector 220 for a certain object 212 classified as a person are 2.8 meters and 0.1 meters respectively. The second probability score $P_2$ computed by the object detector 220 based on the identified physical attributes may be therefore significantly high, for example, $P_2$ (height=2.8, widht=0.1)=0.000001.

The object detector 220 may further analyze a plurality of images captured depicting one or more objects 212 to identify the physical attributes of the respective object 212 with increased accuracy, certainty and/or reliability thus increasing the reliability of the computed second probability score $P_2$ computed for the respective object 212.

As shown at 112, the object detector 220 may apply one or more image processing methods and/or algorithms as known in the art to analyze a plurality of captured images depicting each detected object 212, specifically consecutive images to identify a movement pattern (movement vector) of the respective object 212 defined by one or more movement attributes, for example, a speed, an acceleration, a direction and/or the like. The object detector 220 may select a sequence of images (frames) captured by the imaging sensor(S) 210, for example, 3-15 images to identify the movement vector of the object(s) 212 detected in the images.

As described herein before, the object detector 220 may apply one or more methods to correlate in the captured image(s) between each object 212 classified by the ML model(s) and each object 212 whose movement pattern the object detector 220 identifies in order to ensure that the same object 212 is processed by both the object detector 220 and the ML model(s). Moreover, the object detector 220 may use the bounding box defined in the image(s) by the ML model(s) for each object 212 to correlate between the object 212 classified by the ML model(s) and the object 212 processed by the object detector 220 thus ensuring that the same object 212 is processed by both the object detector 220 and the ML model(s).

The object detector 220 may track one or more objects 212 detected in the consecutive images and based on the distance that the respective object 212 is estimated from the imaging sensor(s) 212 capturing the images and the pixel size proportion, the object detector 220 may compute the movement pattern of the respective object 212. Optionally, the object detector 220 may use the bounding boxes received from the ML model(s) for the objects detected in the captured images to identify, compute and/or estimate the movement pattern of one or more of the objects 212.

Figure 5:
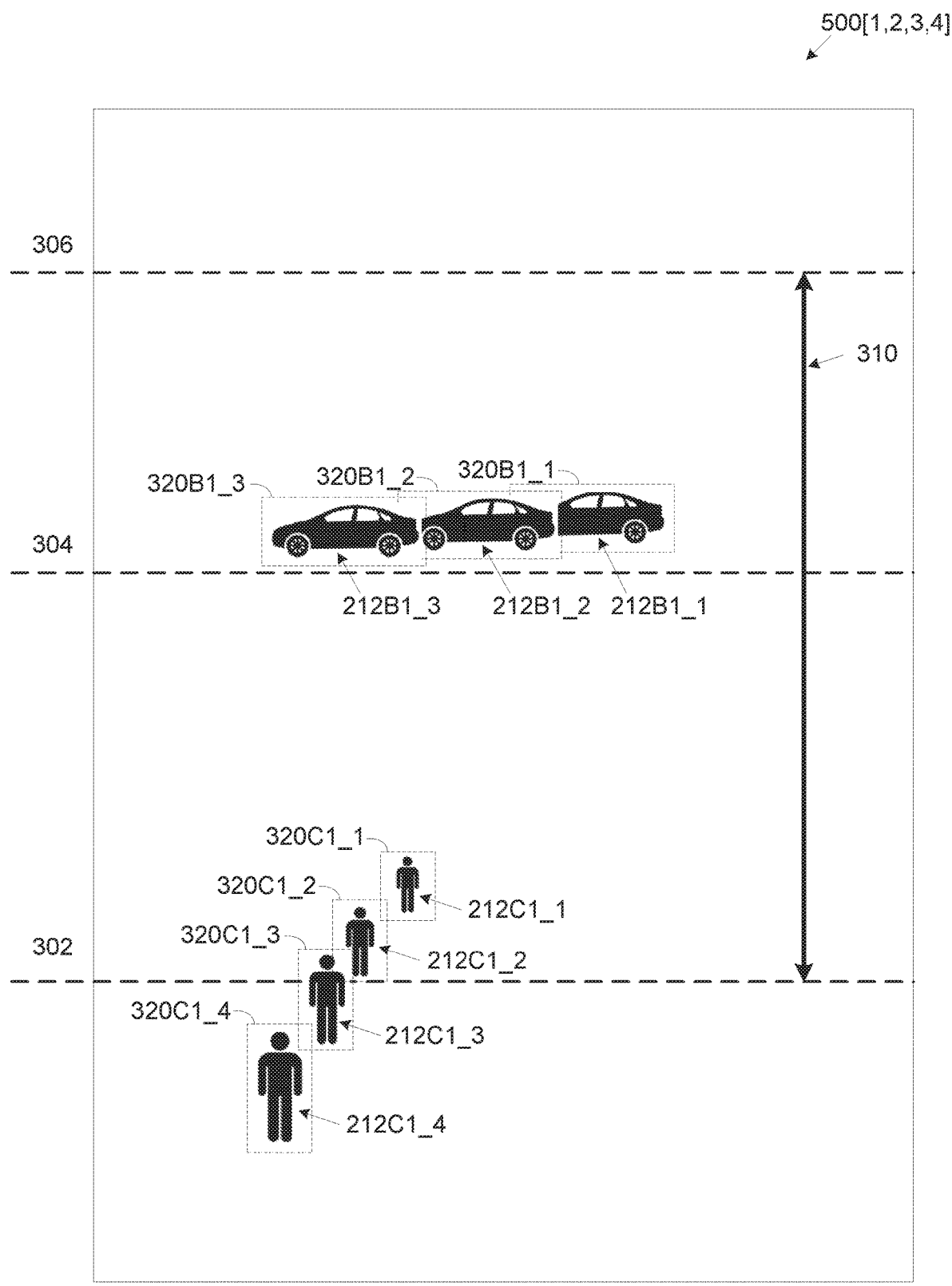
FIG. 5 is a schematic illustration of an exemplary image analyzed to identify and estimate movement patterns of detected objects, according to some embodiments of the present invention.

Reference is now made to FIG. 5, which is a schematic illustration of an exemplary image analyzed to identify and estimate movement patterns of detected objects, according to some embodiments of the present invention. An object detector such as the object detector 220 may detect one or more objects 212, for example, a person 212C1 and a vehicle 212B1 in a plurality of consecutive exemplary images 500[1], 500[2], 500[3], 500[4] and so on captured by an imaging sensor such as the imaging sensor 210.

One or more of the objects 212 detected in the images 500[1,2,3,4], for example, the person 212C1 and the vehicle 212B1 may be moving such that their locations in the field of view of the imaging sensor(s) 210 changes over time and is reflected accordingly in the sequence of images 500[1], 500[2], 500[3], 500[4]. For example, the person 212C1 may be detected at a first location in the image 500[1] (designated 212C1_1), at a second location in the image 500[2] (designated 212C1_2), at a third location in the image 500[3] (designated 212C1_3) and at a fourth location in the image 500[4] (designated 212C1_4). In another example, the vehicle 212B1 may be detected at a first location in the image 500[1] (designated 212B1_1), at a second location in the image 500[2] (designated 212B1_2) and at a third location in the image 500[3] (designated 212B 1_1).

The object detector 220 may therefore identify and/or estimate, based on analysis of the images 500[1,2,3,4], one or more movement attributes of the movement pattern of the objects 212 detected in the images 500[1,2,3,4], for example, the direction, the speed, the acceleration and/or the like.

For example, the object detector 220 may identify, based on analysis of the images 500[1,2,3,4], the direction of movement of the person 212C1. The object detector 220 may thus identify and/or estimate that the person 212C1 is moving along the axis perpendicular to the plane of the imaging sensor(s) 210 and hence advances towards the imaging sensor 210. Based on the distance mapping of the field of view of the imaging sensor(s) 210 as reflected in the images, for example, the distance line 302, the object detector 220 may estimate that the person 212C1 is located at a distance of approximately 100 meters from the imaging sensor 210. In another example, the object detector 220 may identify, based on analysis of the images 500[1,2,3,4], that the vehicle 212B1 is moving along the axis perpendicular to the plane of the imaging sensor(s) 210 and hence advances towards the imaging sensor 210. Based on the distance mapping of the field of view of the imaging sensor(s) 210 as reflected in the images, for example, the distance lines 304 and 306, the object detector 220 may estimate that the vehicle 212B1 is located at a distance of approximately 350 meters from the imaging sensor 210.

In another example, the object detector 220 may identify, based on analysis of the images 500[1,2,3,4], the speed of movement of the person 212C1 and/or the speed of movement of the vehicle 212B1.

In another example, the object detector 220 may identify, based on analysis of the images 500[1,2,3,4], the acceleration of movement of the vehicle 212B1.

Reference is made once again to FIG. 1.

As shown at 114, the object detector 220 may compute a probability score (designated third probability score $P_3$ herein after) for each of the objects 212 detected in the captured image(s) to express the confidence in the class estimated for the respective object 212. The object detector 220 may compute the third probability score $P_3$ for each detected object 212 based on predefined values of the movement attributes of the movement pattern (movement vector) identified for each of the detected objects 212. As described herein before, the class of each of the detected objects 212 may be estimated by the object detector 220 and/or the class may be based on the classification of the ML model(s), i.e., the class (label) received from the ML model(s).

For example, typical speed of a person may be in the range of 2-10 KM/h. Assuming the object detector 220 identifies and/or estimates that a certain object 212 classified as a person is moving at a speed of 6 KM/h, the object detector 220 may compute a significantly high third probability score $P_3$ for the respective person object 212. However, in case the speed estimated for the object 212 classified as person is 40 KM/h, the object detector 220 may compute a significantly low third probability score $P_3$ for the respective person object 212.

The object detector 220 may further compute the third probability score $P_3$ based on one or more of the physical attributes identified and/or estimated for one or more of the objects 212 detected in the images in conjunction with one or more of the movement attributes of the respective detected object 212.

For example, typical frontal width of a person (viewed from the front or back) may be in the range of 0.7-0.9 meters while typical profile width of a person (viewed from the side) may be in the range of 0.3-0.5 meters. Assuming the object detector 220 identifies and/or estimates that a certain object 212 classified as a person is moving towards (or away from) the imaging sensor(s) 210. Therefore, in case the object detector 220 estimates the frontal width of the person object 212 to be outside the typical frontal width range (e.g. 1 meter), the object detector 220 may compute a significantly low third probability score $P_3$ for the respective person object 212. However, in case the frontal width estimated for the object 212 classified as person is within the typical frontal width range (e.g. 0.8 meters), the object detector 220 may compute a significantly high third probability score $P_3$ for the respective person object 212.

Optionally, the object detector 220 adjusts the third probability score $P_3$ computed for one or more of the detected objects 212 according to a terrain on which the respective object 212 is moving. In particular, the object detector 220 may adjust the third probability score $P_3$ according to an impact the terrain may induce on the movement pattern of the respective object 212.

For example, assuming a certain object 212 classified as a car is moving at a speed of 100 KM/h on a high travers ability terrain, for example, a road, the object detector 220 may compute a significantly high third probability score $P_3$ for the certain car object 212. However, in case the certain object 212 classified as a car is moving at a speed of 100 KM/h on a very low travers ability terrain, for example, a swamp area, a sandy beach line and/or the like, the object detector 220 may compute a significantly low third probability score $P_3$ for the certain car object 212.

The object detector 220 may further compute the third probability score $P_3$ for one or more of the objects 212 based on aggregation of a plurality of movement attributes identified for the respective object 212. For example, assuming the speed of the speed movement attribute identified and estimated by the object detector 220 for a certain object 212 classified as a person is 6 KM/h. Further assuming that object detector 220 estimates frontal width of 0.8 meters for the person object 212. In such case, the third probability score $P_3$ computed by the object detector 220 based on the identified movement attributes may be significantly high, for example, $P_3(speed=6, widht=0.8)=0.85$ where the third probability score $P_3$ is in a range of $0 \leq P_3 \leq 1$. In another example, assuming the speed of the speed movement attribute identified and estimated by the object detector 220 for a certain object 212 classified as a person is 40 KM/h. Further assuming that object detector 220 estimates frontal width of 1.2 meters for the person object 212. In such case, the third probability score $P_3$ computed by the object detector 220 based on the identified movement attributes may be significantly low, for example, $P_3$ (speed=40, widht=1.2) =0.000001.

As shown at 116, the object detector 220 may aggregate the first probability score $P_1$, the second probability score $P_2$ and the third probability score $P_3$ to compute an aggregated probability score (confidence score) $P_{AGG}$ for each detected object 212 expressing the probability of correct classification of the respective object 212, i.e. the confidence that the class estimated and/or assigned to the respective object 212 is correct.

The object detector 220 may aggregate the probability scores $P_1$, $P_2$ and $P_3$ according to one or more aggregation methods, techniques and/or algorithms, for example, the Bayesian probability laws and/or the like which rely and express the dependencies of the probability scores $P_1$, $P_2$ and $P_3$. Such dependencies may include, for example, optional reliance on the classification outcome from the ML model(s), the physical attributes (e.g. size, width, height, etc.) used by the object detector 220 in conjunction with the movement attributes (e.g. speed, direction) to compute the third probability score $P_3$, and/or the like.

For example, equation 1 below may express the aggregation of the probability scores $P_2$ and $P_3$ computed for a certain object 212 based on the speed movement attribute identified for the certain object 212, $P_3(Speed)_1$, and the size physical attribute identified for the certain object 212 according to Bayesian probability laws. Further aggregating the class (shape) received for a certain object 212 from the ML model(s) may be expressed by equation 2 below.

$$P_3(Size \cap Speed) = P_3(Size|Speed) * P_3(Speed) \quad \text{Equation 1:}$$

$$P_{AGG}(Size \cap Shape \cap Speed) = P_1(Shape) * P_3(Size|Speed) * P_3(Speed) \quad \text{Equation 2:}$$

Optionally, the object detector 220 analyzes a plurality of consecutive images, specifically a plurality of sequences of consecutive images to average the aggregated probability score $P_{AGG}$ over time and thus increase its accuracy, reliability and/or robustness.

Optionally, the object detector 220 computes the aggregated probability score $P_{AGG}$ based on weights assigned to one or more of the first, second and/or third probability scores $P_1$, $P_2$ and $P_3$ to adjust the contribution of each of the first, second and/or third probability scores $P_1$, $P_2$ and $P_3$ to the overall aggregated probability score $P_{AGG}$.

The weights may be assigned according to one or more parameters, conditions and/or attributes of the detected object(s) 212, operational parameters of the imaging sensor(s) 210 and/or the like. For example, the weight may be assigned according to a size of a detected object 212, a distance of a detected object 212, a resolution of the imaging sensor(s) 210 and/or the like. For example, the ML model(s) as known in the art may be limited in correctly identifying small and/or distant objects 212 occupying a relatively small region in the image(s), for example, 16×16 pixels, 12×12 pixels, 8×8 pixels, 5×5 pixels and/or the like. The weight assigned to the first probability score $P_1$ may be therefore significantly high for large and/or close objects 212 while the same weight assigned to the first probability score $P_1$ may be significantly low for small and/or distant objects 212. In another example, the physical attributes identified for small and/or distant objects 212 occupying a relatively small region in the image(s) may be highly inaccurate while the physical attributes identified for large and/or close objects 212 occupying a relatively large region in the image(s) may be highly accurate. The weight assigned to the second probability score $P_2$ may be therefore significantly high for large and/or close objects 212 while the same weight assigned to the second probability score $P_2$ may be significantly low for small and/or distant objects 212. In another example, the movement pattern of the objects 212 may be significantly reliable and accurate regardless of the size and/or distance of the objects 212 from the imaging sensor(s) 210 and the weight assigned to the third probability score $P_3$ may be therefore significantly high for most if not all objects 212. In another example, the weights may be further adjusted according to the zoom and/or resolution capabilities of the imaging senor(s) 210. For example, the weights assigned to the first probability score $P_1$ and/or the second probability score $P_2$ may be significantly high for high resolution imaging sensor(s) 210 (and hence high resolution images) while the same weights may be significantly reduced for low resolution imaging sensor(s) 210 and low resolution images.

As shown at 118, which is a conditional step, the object detector 220 may compare the aggregated probability score $P_{AGG}$ computed for each detected object 212 to a certain threshold defined to ensure sufficient confidence that the respective object 212 is correctly classified.

In case the aggregated probability score $P_{AGG}$ exceeds the threshold, the object detector 220 may determine with high confidence that the respective object 212 is correctly classified and the process 100 may branch to 116. However, in case the aggregated probability score $P_{AGG}$ does not exceed the threshold, the object detector 220 may determine that the respective object 212 is not correctly classified with sufficient confidence and the process 100 may branch to 102 to initiate another iteration for further analyzing additional images and adjust the aggregated probability score $P_{AGG}$ accordingly.

The threshold used by the object detector 220 to evaluate and/or determine successful recognition of the target person may be predefined. However, according to some embodiments of the present invention, the threshold may not be static and absolute but rather adjustable dynamically according to one or more parameters, for example, quality of the captured images and/or the like.

As shown at 120, after determining that the detected object(s) 212 is classified with sufficient confidence 1, i.e., sufficiently high probability score exceeding the threshold, the object detector 220 may output the class (label) of each detected object 212 optionally with one or more of the physical attributes and/or movement attributes identified for the respective object 212.

The object detector 220 may output, provide, transmit and/or deliver the class (label) of each detected object 212 optionally with its physical and/or movement attributes to one or more object detection based systems, services, platforms and/or the like, for example, an autonomous vehicle (e.g. autonomous car, drone, etc.), a public order system, a security system, a surveillance system and/or the like which may use the object detection and classification according to the nature of the application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of increasing reliability of object detection, comprising:
   receiving a plurality of images of at least one object captured by at least one imaging sensor;
   receiving an object classification coupled with a first probability score from at least one machine learning model trained to detect the at least one object which is applied to at least one of the plurality of images;
   computing a second probability score for classification of the at least one object according to at least one physical attribute of the at least one object estimated by analyzing the at least one image;
   computing a third probability score for classification of the at least one object according to a movement pattern of the at least one object estimated by analyzing at least some consecutive images of the plurality of images;
   computing an aggregated probability score by aggregating the first, second and third probability scores;
   outputting, in case the aggregated probability score exceeds a certain threshold, the classification of the at least one object coupled with the aggregated probability score for use by at least one object detection based system.

2. The computer implemented method of claim 1, wherein the at least one machine learning model is neural network.

3. The computer implemented method of claim 1, wherein the at least one physical attribute is a member of a group consisting of: a shape, a size, a height and, a width and a length.

4. The computer implemented method of claim 1, wherein the movement pattern is defined by at least one movement attribute which is a member of a group consisting of: a speed, an acceleration and a direction.

5. The computer implemented method of claim 1, wherein at least one algorithm is applied to ensure that the at least one object is the same object classified by the at least one machine learning model, classified based on the estimated at least one physical attribute and classified based on the estimated movement pattern.

6. The computer implemented method of claim 5, wherein the at least one algorithm comprises an intersection over union.

7. The computer implemented method of claim 1, further comprising receiving a bounding box from the at least one machine learning model, the bounding box bounds the at least one object in the at least one image and computing the second and third probability scores for classification of the at least one object which is detected in the bounding box.

8. The computer implemented method of claim 7, further comprising identifying the at least one physical attribute of the at least one object based on the bounding box received from the at least one machine learning model.

9. The computer implemented method of claim 1, wherein the analysis of the at least one image to estimate the at least one physical attribute and the movement pattern is based on a proportion between a pixel size characteristic to the at least one imaging sensor and a distance between the at least one imaging device and the at least one object, the proportion is determined based on calibration of the at least one imaging sensor.

10. The computer implemented method of claim 9, wherein the calibration is based on at least one predefined physical attribute of at least one reference object detected in at least one image captured by the at least one imaging sensor.

11. The computer implemented method of claim 9, wherein the calibration is based on a distance to at least one reference object detected in at least one image captured by the at least one imaging sensor, the distance is determined according to at least one of: a predefined distance and a measurement received from at least one distance measurement device associated with the at least one imaging sensor.

12. The computer implemented method of claim 9, wherein the calibration is based on depth data received from at least one imaging sensor.

13. The computer implemented method of claim 1, further comprising analyzing a plurality of the consecutive images to identify the at least one physical attribute of the at least one object.

14. The computer implemented method of claim 1, further comprising adjusting the third probability score according to an impact to the movement pattern induced by a terrain on which the at least one object is moving.

15. The computer implemented method of claim 1, further comprising analyzing a plurality of the consecutive sequences of images to average the aggregated probability score over time.

16. The computer implemented method of claim 1, further comprising computing the aggregated probability score based on weights assigned to at least one of the first, second and third probability scores according to at least one of: a size of the at least one object and a distance of the at least one object.

17. A system for increasing reliability of object detection, comprising:
    at least one processor executing a code, the code comprising:
        code instructions to receive a plurality of images of at least one object captured by at least one imaging sensor;
        code instructions to receive an object classification coupled with a first probability score from at least one machine learning model trained to detect the at least one object which is applied to the at least one of the plurality of images;
        code instructions to compute a second probability score for classification of the at least one object according to at least one physical attribute of the at least one object estimated by analyzing the at least one image;
        code instructions to compute a third probability score for classification of the at least one object according to a movement pattern of the at least one object estimated by analyzing at least some consecutive images of the plurality of images;
        code instructions to compute an aggregated probability score by aggregating the first, second and third probability scores;
        code instructions to output, in case the aggregated probability score exceeds a certain threshold, the classification of the at least one object coupled with the aggregated probability score for use by at least one object detection based system.

* * * * *